United States Patent [19]

McMillan et al.

[11] Patent Number: 4,473,476

[45] Date of Patent: Sep. 25, 1984

[54] METHOD OF REVERSE OSMOSIS EMPLOYING AN IMPROVED POROUS GLASS MEMBRANE

[75] Inventors: Peter W. McMillan, Leamington Spa; Ronald Maddison, Bedworth, both of England

[73] Assignee: National Research Development Corporation, London, England

[21] Appl. No.: 463,077

[22] Filed: Feb. 2, 1983

Related U.S. Application Data

[63] Continuation of Ser. No. 256,947, Apr. 23, 1981, abandoned.

[30] Foreign Application Priority Data

Apr. 28, 1980 [GB] United Kingdom ............... 8013918

[51] Int. Cl.$^3$ ............................................. B01D 13/00
[52] U.S. Cl. ................................... 210/653; 210/500.2
[58] Field of Search .................. 210/500.2, 321.1, 653

[56] References Cited

U.S. PATENT DOCUMENTS 3,926,799 12/1975 Thomas et al. ............... 210/500.2 X
3,972,721 10/1976 Hammel et al. ............... 252/242 X

FOREIGN PATENT DOCUMENTS 1107397 3/1968 United Kingdom ................ 65/31

OTHER PUBLICATIONS

Marcinkowsky et al., "Hyperfiltration Studies... Oxide Membranes", from J. Am. Chem. Soc., 88:24, 12–66, pp. 5744–5746.
Ceramic Bulletin, vol. 57, No. 11, Nov. 1978, T. H. Elmer, Evaluation of Porous Glass as Desalination Membrane, pp. 1051–1054.

*Primary Examiner*—Frank Spear
*Attorney, Agent, or Firm*—Stevens, Davis, Miller & Mosher

[57] ABSTRACT

A porous glass membrane for reverse osmosis desalination of salt water is made by heating a membrane of a sodium-boron-alumino silicate glass so that it separates into two inter-connecting phases, removing one phase to make the membrane porous, and then coating the pores with a metal oxide to modify the pore size distribution and strengthen the membrane to enable it to withstand the high pressure applied in the reverse osmosis process. The porous glass is first treated with a volatile metal chloride such as titanium chloride, and the resulting surface layer is hydrolyzed to produce the metal oxide coating. A further reduction in pore size with an accompanying increase in strength can be made by partially sintering the treated membrane.

6 Claims, No Drawings

METHOD OF REVERSE OSMOSIS EMPLOYING AN IMPROVED POROUS GLASS MEMBRANE

This is a continuation of application Ser. No. 256,947 filed Apr. 23, 1981, now abandoned.

The invention relates to porous glass membranes.

One possible application of porous glass is as a semipermeable membrane for reverse osmosis desalination. There have been several investigations into the performance of such membranes which have shown that they have great potential in this and the related field of hyperfiltration. Commercial exploitation of porous glass membranes has been limited however, by the poor mechanical strength of porous glass.

Porous glass is produced by the removal of one of the two interconnecting phases that can be induced in certain glasses. The pore volume of the remaining skeleton is dependent on the relative volume of the soluble phase and hence is dependent on the composition of the parent glass. The size of the pores and the distribution of pore sizes are controlled by thermal treatment. By careful control of this treatment a narrow distribution of pore size in the porous glass can be attained with the peak in the distribution being between 20 to 1000 Å.

The pore size of the finest pored materials cannot easily be measured by conventional techniques, e.g., electron microscopy. Such materials are usually characterized by inert gas adsorption. This technique enables the pore size distribution of the porous glass to be determined with a high degree of precision. The pore sizes referred to hereafter relate to the peak in this distribution, i.e., the most common pore radius of the material.

The basic principle of reverse osmosis desalination is that a solvent will pass through a semi-permeable membrane, but a solute will not. If a salt solution and pure water are separated by a porous glass membrane containing pores of about 20 Å, the pure water will pass through the membrane to dilute the salt solution. The application of a pressure to oppose this flow can reverse this process, i.e., cause water to leave the salt solution. To overcome the osmosis process, and so perform desalination, the applied pressure must exceed the osmotic pressure of the salt solution. For seawater (~3.5 wt. % NaCl) the osmotic pressure is approximately 1.7 MPa.

Two measures of the reverse osmosis performance of membranes are the flux rate of the product (lt/m²/hr) and the salt rejection. The salt rejection is defined as $$\text{Rejection } \% = \frac{Cf - Cp}{Cf} \times 100$$

where Cf is the salt concentration of the feed solution and Cp is the salt concentration of the product solution. The salt rejection in porous glass appears to be controlled by the pore size of the glass. Salt rejection with glass membranes containing pores of up to 30 Å radius has been reported, but the rejection is greatly improved if the pore size is below 20 Å.

The object of the present invention is to provide a porous glass membrane which is stronger than has been possible heretobefore and therefore more practically viable for reverse osmosis and related applications.

The invention comprises a porous glass membrane whose pore surfaces are coated with a metal oxide. This is achieved by first treating the glass with the metal chloride and subsequently hydrolyzing the surface layer thus formed to produce the metal oxide. This treatment improves the mechanical strength of the membranes by a factor of approximately 2 and slightly reduces the pore size and porous volume of the glass. A further reduction in the pore size and an accompanying increase in the strength of the membrane can be made by partially sintering the treated membrane.

Many volatile metal chlorides can be used for this treatment but to cause these to react with the surface hydroxyl groups on the glass it is necessary to apply them to the porous glass at characteristic elevated temperatures. For example when coating with tin oxide, $SnCl_4$ must be applied to the glass at a temperature of at least 400° C. Titanium oxide is the preferred coating for the membrane. When applying titanium chloride in the first stage of the application of the metal oxide coating, the glass is held at a temperature of 80° C. 2 ml of the volatile liquid chloride is introduced into a stream of nitrogen passed over the glass. After this step water vapour is introduced into the nitrogen stream to replace the remaining chlorine. The surface of the glass is then rehydrated by immersing in water. Any unreacted $TiO_2$ precipitate in the glass can then be removed by ultra sonic excitation of the glass in water.

In one example of the invention the metal oxide coating is applied to a porous glass membrane consisting of a sodium-boron-alumino silicate of the composition 61.8 $SiO_2$, 27.5 $B_2O_3$, 7.1 $Na_2O$ and 3.6 wt. % $Al_2O_3$ which is first heat treated between 550° and 600° C. for 3 hours causing it to separate into an acid insoluble $SiO_2$ rich phase and an acid soluble phase, and then treated in mineral acid to remove the soluble phase and leave a skeleton of silica. For a glass of this composition the pore volume, before coating with metal oxide, is approximately 35% (by volume).

A porous glass, for example a sodium-boron-alumino silicate of composition 61.8 $SiO_2$, 27.5 $B_2O_3$, 7.1 $Na_2$ and 3.6 wt % $Al_2O_3$ was first heat treated at 575° C. for 3 hours to cause it to separate into an acid insoluble $SiO_2$ rich phase and an acid soluble phase. The 2-phase glass was then treated in mineral acid to remove the soluble phase, leaving a skeleton of silica. The leaching of the glass was undertaken with 5 v/v% hydrochloric acid solution at 25° C. for 48 hours. After leaching the porous glass was washed in running distilled water for 4 hours. This glass contained pores of 25 Å radius. A second example of glass was made containing pores of 40 Å radius. This was produced from the same parent glass after thermal treatment at 595° C. Both examples of porous glass were in the form of thin hollow fibres of 0.8 mm outside diameter with a wall thickness of 150 μm, as would be suitable for use as a reverse osmosis membrane.

Before treatment, according to the invention, the larger pored material showed no measurable salt rejection using a 3.5 wt. % NaCl solution at an operating pressure of 7 MPa while the glass with 25 Å pores exhibited a rejection of 20% with a flux rate of 15 lt/m²/hr under the same conditions.

EXAMPLE 1

The treatment of porous glass membranes containing pores of 25 Å radius.

1. Dry the porous glass: this is necessary to remove the physically adsorbed water present in the pores and is achieved by first holding the porous glass at 80° C. for 3 hours in flowing dry $N_2$ gas (2 lt/min) and then holding at 200° C. for a further 3 hours in the $N_2$ stream.

2. Coat the porous glass with TiO$_2$: the TiO$_2$ blanket is applied in two stages. First TiCl$_4$ is reacted with the porous glass, by introducing 2 ml of the volatile liquid chloride into the N$_2$ stream. This is carried over the membrane (held at 80° C.) and reacts with the chemically bonded hydroxyl groups remaining on the glass surface. The reaction is

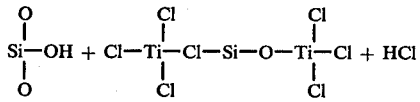

The remaining chlorine is then replaced by oxygen by introducing water vapour into the N$_2$ stream. This completes the oxidation of the metal chloride and produces further HCl vapour.

3. Rehydrate the surface of the membrane: after exposure to water vapour, the membrane must be saturated with water to rehydrate the surface. This is achieved by immersing the membrane in water. Any unreacted TiO$_2$ precipitate in the glass can be removed by the ultra-sonic excitation of the membrane in water. This requires at least 1 hour.

The modified membrane contains pores of 22 Å and is stronger than the untreated membrane by a factor of approximately two. The salt rejection of the modified membrane is 65%, of 20% before treatment, with a product flux rate of 2 lt/m$^2$/hr.

Other volatile metal chlorides can be used for this treatment but to cause these to react with the surface hydroxyl groups on the glass it is necessary to apply them to the porous glass at characteristic elevated temperatures. For example when coating with stannous oxide, SnCl$_4$ must be applied to the glass at a temperature of at least 400° C. The other steps in the process, however, remain unchanged.

To further reduce the pore size of the glass, the treated membrane can be partially sintered at elevated temperatures. To illustrate this, the treatment of the porous glass containing pores of 40 Å radius is described.

EXAMPLE 2

The treatment of porous glass containing pores of 40 Å radius

1. Dry the porous glass: as step 1 in example 1.
2. Coat the porous glass with TiO$_2$: as step 2 in example 1.
3. Partially sinter the material: hold the coated glass at 800° C. for 30 minutes in an oxidising atmosphere.
4. Rehydrate the surface of the material: as step 3 in example 1.

This treatment reduces the pore volume from 35% to 20% and reduces the pore size from 40 Å to approximately 30 Å. The treated membrane exhibits a salt rejection of between 15 to 20% with a product flux of at least 10/lt/m$^2$/hr. The treated membranes are also approximately 2.5 times stronger than the original untreated membrane.

The change in pore volume and pore size can be increased by partially sintering at higher temperatures or for longer times. Other volatile metal chlorides can be used for the treatment, but as already stated these must be applied to the membrane at higher temperatures.

The modification of the smaller pored membrane (25 Å pore radius) by the treatment described in example 2 produces pores of between 18 to 20 Å. This modified membrane shows a salt rejection of approximately 90% with flux rates of between 0.2 to 0.5 lt/m$^2$/hr.

Partially sintering the porous material in an oxygen deficient atmosphere modifies the oxidation state of the metal oxide coating. For example after sintering in the presence of forming gas (90% N$_2$-10% M$_2$) or in a nitriding atmosphere (bubbling N$_2$ gas through an ammonia solution) the modified membrane has a metallic appearance.

The pore size and strength of porous glass membranes can thus be modified by treatment with a volatile metal chloride vapour and subsequently hydrolyzing the treated surfaces of the membranes to form a coating of metal oxide on the glass. The pore size can be further reduced and the strength further improved by partially sintering the treated membrane. These treatments cause an increase in the salt rejection of the glass membrane and reduce its fragility. Other modifications to the invention will be apparent to those skilled in the art.

I claim:

1. A method of reverse osmosis wherein a porous glass membrane is used as a reverse osmosis membrane, the porous glass membrane having been made by the steps comprising:
   (a) selecting a glass capable of phase separation into two interconnecting phases;
   (b) treating a membrane of solid glass to cause said phase separation;
   (c) removing one of the two phases to form a porous glass membrane;
   (d) drying the porous glass membrane in a stream of nitrogen;
   (e) heating the porous glass membrane prior to deposition of a volatile metal chloride;
   (f) volatilizing the metal chloride and introducing the volatilized metal chloride into the stream of nitrogen to deposit the metal chloride on the porous glass membrane, thereby forming a metal chloride surface layer on the pores of the porous glass membrane;
   (g) hydrolyzing the metal chloride surface layer to produce a coating of metal oxide; and
   (h) after hydrolyzing the metal chloride surface layer, rehydrating the porous glass membrane by immersing the membrane in water.

2. A method of reverse osmosis as claimed in claim 1, wherein the metal chloride is titanium chloride and the porous glass membrane is heated to a temperature of at least 80° C. in order to form the titanium chloride surface layer.

3. A method of reverse osmosis as claimed in claim 2, wherein the metal oxide-coated porous glass membrane is partially sintered in order to reduce the pore size of the membrane.

4. A method of reverse osmosis as claimed in claim 1, wherein the metal chloride is tin chloride and the porous glass membrane is heated to a temperature of at least 400° C. in order to form the tin chloride surface layer.

5. A method of reverse osmosis as claimed in claim 4, wherein the metal oxide-coated porous glass membrane is partially sintered in order to reduce the pore size of the membrane.

6. A method of reverse osmosis as claimed in claim 1, wherein the metal oxide-coated porous glass membrane is partially sintered in order to reduce the pore size of the membrane.

* * * * *